(12) United States Patent
Choi et al.

(10) Patent No.: US 9,111,114 B1
(45) Date of Patent: Aug. 18, 2015

(54) METHOD OF TRANSFORMING DATABASE SYSTEM PRIVILEGES TO OBJECT PRIVILEGES

(75) Inventors: King Lun Choi, Palo Alto, CA (US); Alon Goldshuv, Tel Aviv (IL)

(73) Assignee: Pivotal Software, Inc., Palo Alto, CA (US)

( * ) Notice: Subject to any disclaimer, the term of this patent is extended or adjusted under 35 U.S.C. 154(b) by 397 days.

(21) Appl. No.: 13/371,333

(22) Filed: Feb. 10, 2012

(51) Int. Cl.
*G06F 17/30* (2006.01)
*G06F 21/62* (2013.01)

(52) U.S. Cl.
CPC .................................. *G06F 21/6227* (2013.01)

(58) Field of Classification Search
None
See application file for complete search history.

(56) References Cited

U.S. PATENT DOCUMENTS

| | | | | |
|---|---|---|---|---|
| 5,335,346 | A * | 8/1994 | Fabbio | 711/163 |
| 2009/0106256 | A1 * | 4/2009 | Safari et al. | 707/10 |
| 2011/0067084 | A1 * | 3/2011 | Byun et al. | 726/1 |

OTHER PUBLICATIONS

Oracle Database Security Guide [online], Dec. 2003 [retrieved on Mar. 5, 2013]. Retrieved from the Internet: <URL: http://docs.oracle.com/cd/B12037_01/network.101/b10773.pdf>.*

Baldwin, Naming and Grouping Privileges to Simplify Security Management in Large Databases, IEEE, 1990, retrieved on Jul. 25, 2013, retrieved from the Internet <URL: http://ieeexplore.ieee.org/xpls/abs_all.jsp?arnumber=63844&tag=1>.*

Felt et al., Diesel: Applying Privilege Separation to Database Access, AsiaCCS 2011 Hong Kong, retrieved on Jul. 25, 2013, retrieved from the internet <URL: http://www.cs.berkeley.edu/~finifter/papers/diesel.pdf>.*

Oracle, ALL_OBJECTS, Oracle TimesTen In-Memory Database SQL Reference Release 11.2.1, 2009, retrieved on Aug. 2, 2013, retrieved from the Internet <URL: http://oracle.su/docs/11g/timesten.112/e13070/ttsql355.htm>.*

Greenplum, Greenplum Database 4.1 Administrator Guide, 2011, retrieved on Aug. 2, 2013, retrieved from the Internet <URL: http://media.gpadmin.me/wp-content/uploads/2011/05/GP-4100-AdminGuide.pdf>.*

* cited by examiner

*Primary Examiner* — Neveen Abel Jalil
*Assistant Examiner* — Tyler Torgrimson
(74) *Attorney, Agent, or Firm* — Fish & Richardson P.C.

(57) ABSTRACT

Coarse-grained system-wide database privileges are transformed into new finer-grained database object privileges that are user-centric and specific to particular objects by creating an object class defining certain generic operations on objects, and defining within the object class a new object that embodies permissible actions on a particular database object. The new object is stored in a catalog table that comprises an object privilege table and is associated in the object privilege table with a consolidated grouping of object privileges of users relative to the new object.

18 Claims, 3 Drawing Sheets

METHOD OF TRANSFORMING DATABASE SYSTEM PRIVILEGES TO OBJECT PRIVILEGES

BACKGROUND

This invention relates generally to databases, and more particularly to methods for efficiently managing permissions of database users with respect to database objects.

Enterprises and other large organizations frequently employ large and complex database systems for storing critical information to which a large number of users may require access. For security, data integrity and other reasons, it is necessary to manage and control the permissions ("privileges") that users have to access, change or create data in the database. This is typically handled with two different types of privilege models, a system privilege and an object privilege. System privileges are database user-centric. They are system wide and apply to database users according to role. They may include, for example, the ability to access an external table, to create a database table, or to create and assign users to roles, where a role is a classification comprising a logical grouping of privileges applicable to a particular user. Object privileges, in contrast, are database object-centric. They apply to a particular database user, but the privileges are with respect only to a given database object. Object privileges are typically defined separately for the various operations or functions possible on a database object, such as a table, and include, for example, the rights to read or write the table.

It is frequently necessary to add or drop database users, or to change or update system privileges of users and their privileges with respect to objects. Additionally, it is also necessary at times to add new objects and to extend privileges to these. System privileges are typically stored in a system privilege table that lists each user on a separate row, and that user's privileges in separate columns. Updating a system privilege table to accommodate changes such as the foregoing can be a resource intensive and time-consuming effort.

Accordingly, it is desirable to afford more flexible and efficient approaches for managing database permissions and privileges, and it is to these ends that the present invention is directed

DESCRIPTION OF PREFERRED EMBODIMENTS

The invention may be employed effectively with different types of distributed and non-distributed database architectures. An example of a type of distributed database architecture with which the invention may be used is a shared-nothing distributed database architecture, and the invention will be described in that context. However, as will be appreciated, this is illustrative of only one utility of the invention.

Figure 1:
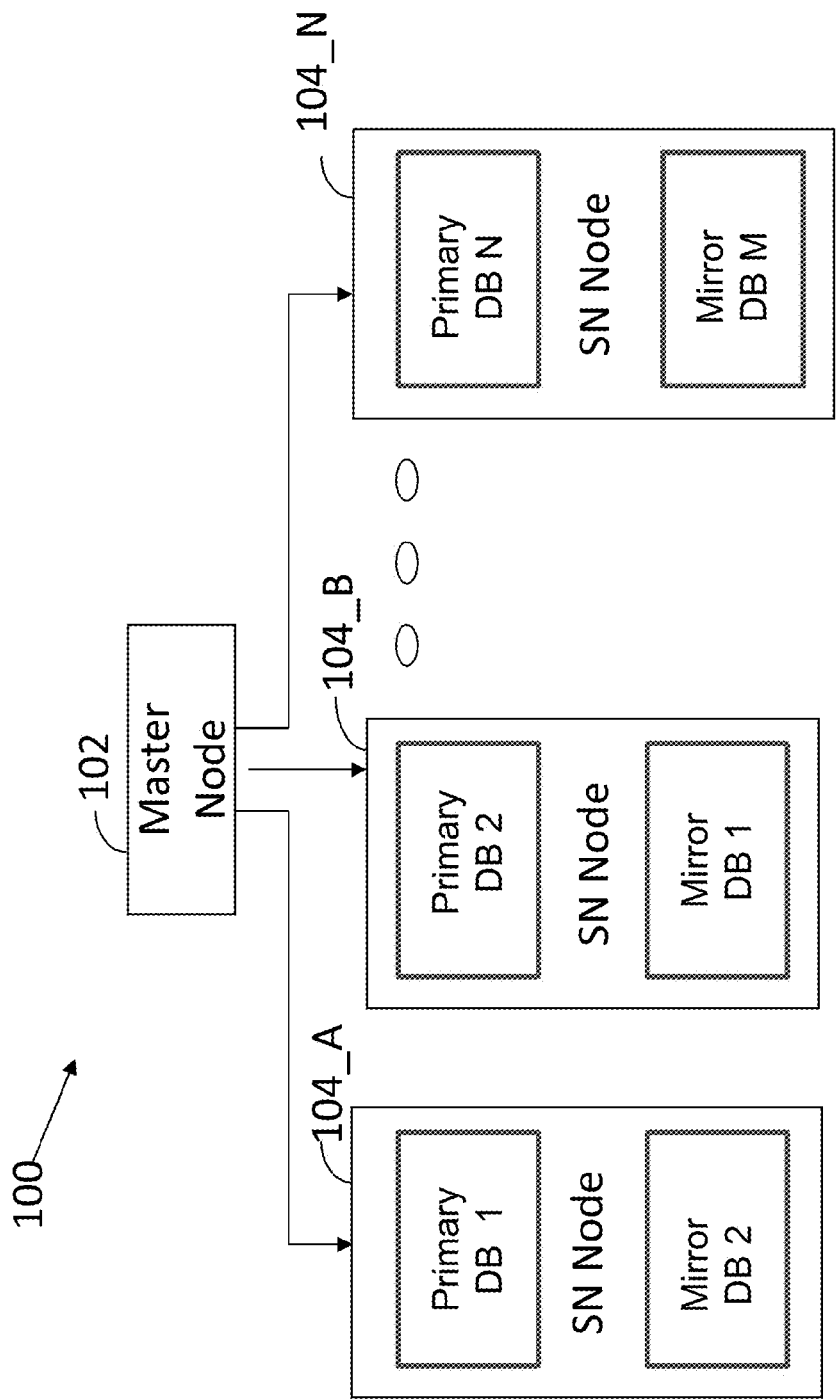
FIG. 1 is a block diagram of one type of a database system with which the invention may be employed.

FIG. 1 illustrates a shared-nothing network architecture of a logical distributed database 100 of an enterprise with which the invention may be employed. The database may include a master node 102 which connects to a plurality of shared-nothing nodes 104-A through 104-N. Each node may comprise a plurality of database (DB) segments (database instances) including one or more primary databases and one or more mirror databases. As indicated in the figure, for fault tolerance purposes, a primary database segment and its corresponding mirror database segment may be located on different nodes. Node 104-A may contain, for example, Primary DB 1 and Mirror DB 2, whereas node 104-B may contain Primary DB 2 and Mirror DB 1. Thus, mirroring Primary DB 1 on node 104-A requires that primary data be written (replicated) to Mirror DB 1 on node 104-B. The master and segment nodes may be server applications having the same process model as a standalone server and augmented with extensions for a distributed system, such as data distribution, remote process communications, and data replication between primary-mirror pairs.

Figure 2:
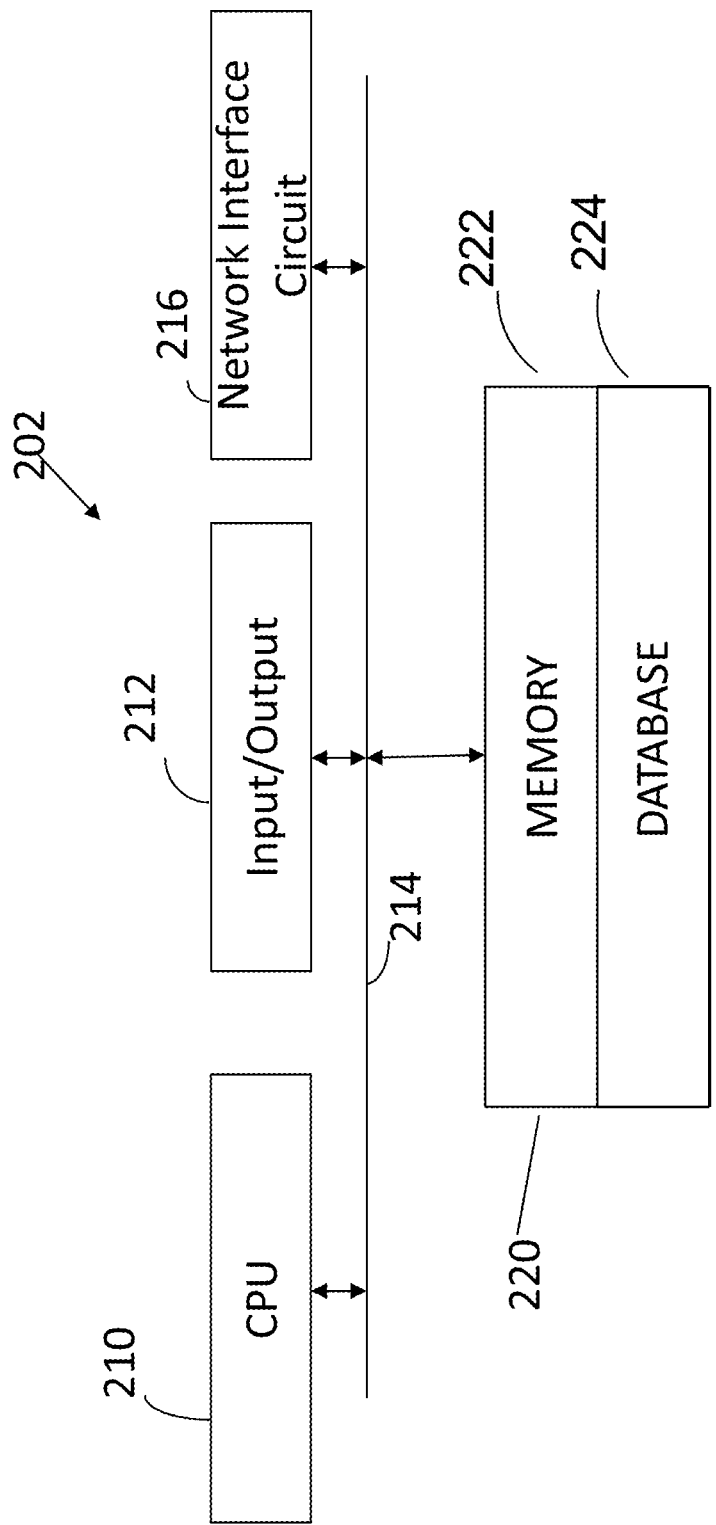
FIG. 2 is a block diagram illustrating a node of the database system of FIG. 1.

FIG. 2 illustrates an example of architecture of a master node 202 of the database that is configured to perform processes and operations in accordance with the invention. The master node 202 may comprise a host computer server system (which may comprise a single CPU 210 or may be a multiprocessor system comprising a plurality of CPUs) connected to input/output (I/O) devices 212 by a bus 214. The I/O devices may be standard computer system input and output devices. A network interface circuit 216 may also be connected to bus 214 to allow the master node to operate in the networked environment of the database of FIG. 1. The master node may further have a memory 220 comprising non-transitory physical storage media connected to the bus that embodies executable instructions to control the operations of the computer system. Memory 220 may include a main memory 222 comprising instructions that control the CPU to operate in accordance with the invention, as will be described, and may contain a storage 224 for storing a database and a database catalog. The catalog in a database, as is well known, stores, among other things, metadata that serves as an index to the actual database data and tables of users and privileges that are used for controlling access to the database and permissible actions.

As noted above, the ability of users to interact with a database and with particular objects is defined by system privileges and object privileges, respectively. Users may be classified according to roles, e.g., administrator, developer, user, etc., and system privileges may be allocated to users on the basis of roles. A role effectively comprises a logical grouping of privileges. Moreover, certain privileges may be granted to a user depending upon whether the user is a "super user" or a "non-super user".

Figure 3:
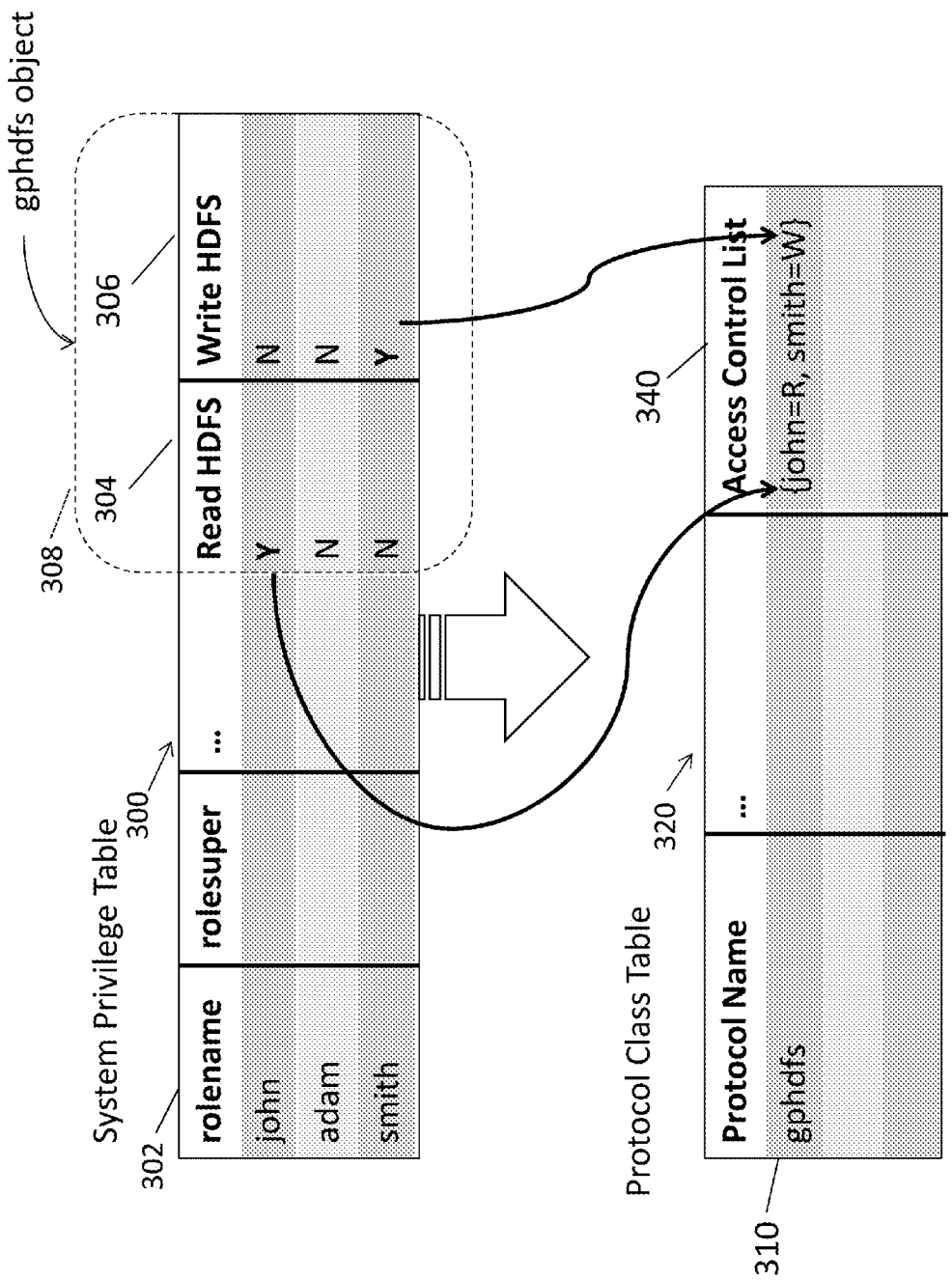
FIG. 3 is a diagrammatic view illustrating the transformation of system privileges into object privileges in accordance with the invention.

Currently, system and object privileges are typically maintained in the database catalog in a system privilege table such table 300 shown in FIG. 3. Each user or role is allocated one row of the table. One column 302 indicates the user's name, and other separate columns, e.g., 304, 306 indicate the privileges that user has create an external table to read and write, respectively, a file system HDFS. Three users, "john", "adam", and "smith", are shown in column 302 labeled "rolename" on separate rows of the system privilege table 300, and their system permissions to create "readable" and "writable" external tables, e.g., for file system object "HDFS", are indicated in separate columns 304 and 306, respectively, of the table. Each column pertains to a different function relative to the object class 308 and characterizes the user's associated privilege relative to the particular function. Other columns of the table, not shown, may indicate the privileges of each user to perform other operations/functions on a given object class, as well as with respect to the database itself and to other objects.

Whenever a user attempts to perform an action with respect to the database or to an object, that user's row of the system privilege table is read and the multiple entries, i.e., columns, applicable to the object are checked to determine the privileges of that user with respect to the object before permitting the user to proceed with the attempted action. When the database is upgraded, when new users or objects or added to the system, or when privileges are changed, the system privilege table must be updated accordingly.

As will be described, the invention affords a more flexible and efficient method for managing privileges and permissible actions with respect to database objects by transforming an arbitrary set of system privileges into object privileges, and managing the object privileges directly for a user based upon the user's system privileges. This basically comprises looking at the system privileges of the particular user to perform certain operations, and transforming these system privileges into corresponding object privileges for that user. As will also be described, the invention may first create an object class, e.g., "protocol", that defines certain generic operations such as, for example, "connect to" an external data source. Next, a new object may be created that captures the permissible actions on an existing object, or defined for a newly created object, that correspond to certain functions, e.g., "read" and "write". Users' system privileges are transformed into object privileges, where users may be selectively given object privileges to the newly created object based upon their system privileges. These object privileges may be consolidated for users and recorded in an object privilege table for the newly created object. When a user attempts to perform an action on an object, the consolidated listing of user privileges for that object in the object privilege table listing can be checked to determine the privilege of the user to perform the attempted action for that particular object, rather than checking multiple entries in the system privilege table.

Referring to FIG. 3, in an embodiment, the system privilege table 300 indicates in columns 304 and 306 of the table the read and write privileges that each of the three users "john", "adam", and "smith" has relative to the external table, file system "HDFS" object class 308. HDFS may be a flat external file system object. There are four system privilege values applicable to an external table, i.e., no privilege, create readable external table, create writeable external table, and create both readable and writeable external table. For each user listed in table 300, the user's privileges relative to the external table "HDFS" are indicated in the separate columns of the table labeled "Read HDFS" and "Write HDFS" by the yes/no indications "Y" and "N".

In accordance with an embodiment of the invention, a new database object class "protocol" may be created that encapsulates the same set of four system privilege values, and retains the same semantics as "none", "create read", "create write", and "create both read and write", and a new protocol object named "gphdfs" 308 to connect to a HDFS data source may be created that captures the "read" and "write" permissions of columns 304 and 306 of the system privilege table 300. Current privilege checks on system privileges to interact with HDFS are converted by the invention to checks of object privileges on the new object "gphdfs" in an object privilege table, as will be described. This allows the metadata in the system privilege to be safely discarded.

Protocol object "gphdfs" may be created during a database upgrade, for example, and a new object protocol class table 320 may be created that lists the protocol object "gphdfs" in a row 310 and indicates the privileges for the object in a column 340, as shown in FIG. 3. Protocol class table 320 may be a catalog table that comprises the object privilege table as the first column "Protocol Name" and column 340, the Access Control List, and may also contain other information (not shown) in other columns. Preferably, by default, no database user will initially have privileges on this new protocol object "gphdfs". During an upgrade, database users may be granted "read"/"write" privileges on the protocol object "gphdfs" only if the users have corresponding system privileges "create readable external table"/"create writable external table". Those users having read "R" and write "W" privileges may be listed in column 340 headed "access control list" of the protocol class table 320 by name and with an indication of their privileges. The access control list of column 340 provides a consolidated listing of user object privileges for object "gphdfs". Thus, user "john", who is shown in table 300 as having system privileges to read HDFS, is associated with the indicator "R" in column 340, row 310, of table 320, and user "smith" who has write privileges to HDFS as indicated in column 306 of table 300 is associated with the indicator "W" in column 340, row 310. Since database user "adam" has neither read nor write system privileges to HDFS, "adam" is omitted from the access control list of column 340 since he has no privileges relative to the new protocol object "gphdfs".

The invention, by creating a new protocol class having general functionality and then applying this protocol class to specific objects, transforms system privileges into object privileges. Thus, when a database user attempts to perform an action on an object, the user's object privileges for that object can be readily determined by reading a single access control list column in a protocol class table for that object, rather than having to access multiple columns defining different privileges for the object in a system privilege table. This affords more efficient database operations.

Furthermore, creating a protocol class object as a layer between system privileges and object privileges, and transforming system privileges into object privileges, as described, affords greater flexibility, extensibility, and manageability of database privileges. Protocol class objects can be created and managed, as desired, to afford generalized functionality which can selectively be applied to specific objects. This facilitates adding or changing the functionality applicable to an object, such as an external table, and enables each separate function may have its own permission controls, thereby affording finer-grained control and manageability. Moreover, this permits new privileges to be added and existing privileges to be deleted or changed conveniently and easily without having to change system privileges.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method for managing access privileges to objects in a database system, comprising:
   determining by a processor, from system privileges of a plurality of users applicable to an object type, a set of permissible generic operations applicable to a particular object of that object type;
   creating a new object class that encapsulates said set of permissible generic operations as object privileges;
   creating a new object corresponding to said particular object within said new object class;
   selectively granting individual users of said plurality of users certain ones of said object privileges to said new object based upon each individual user's system privileges applicable to said object type; and storing in said database system said object privileges of said each individual user to said new object, said object privileges of said each individual user being stored with object privileges of other users to said new object, wherein storing said object privileges of said each individual user to said new object comprises:
  listing said new object in an object class table; and
  storing, in the object class table, a consolidated listing of different object privileges for each said individual users in association with the new object listing.

2. The method of claim 1, wherein the new object is a protocol object, the object class table is a protocol class table having a column corresponding to a protocol name of the new object.

3. The method of claim 1, wherein the object class table is a new object class table created during a database update.

4. The method of claim 3, wherein said new object is listed in said new object class table on a single row, and said consolidated listing of different object privileges of other users is contained in a column of said row.

5. The method of claim 1, wherein said selectively granting individual users object privileges to said new object comprises granting said object privileges according to each individual user's role.

6. The method of claim 1, wherein said user's system privileges are relative to an external table, and comprise no privilege, the privileges to create a readable external table, create a writeable external table, and create both a readable and writeable external table, and where said object privileges to said new object comprise none, create read, create write, and create both read and write.

7. The method of claim 6, wherein said selectively granting comprises mapping said individual user's system privileges to said new object privileges.

8. The method of claim 1 further comprising deleting system privilege metadata from a system privilege table upon said storing said object privileges to said new object.

9. The method of claim 1 further comprising checking a user's new object privileges before granting a user's request for an action on said new object.

10. Computer readable non-transitory storage medium for storing instructions for controlling the operation of a computer to manage access privileges to object objects in a database system, comprising instructions that when executed perform operations comprising:
  determining, from system privileges of a plurality of users applicable to an object type, a set of permissible generic operations applicable to a particular object of that object type;
  creating a new object class that encapsulates said set of permissible generic operations as object privileges;
  creating a new object corresponding to said particular object within said new object class;
  selectively granting individual users of said plurality of users certain ones of said object privileges to said new object based upon each individual user's system privileges applicable to said object type; and
  storing in said database system said object privileges of said each individual user to said new object, said object privileges of said each individual user being stored with object privileges of other users to said new object, wherein storing said object privileges of said each individual user to said new object comprises:
    listing said new object in an object class table; and
    storing, in the object class table, a consolidated listing of different object privileges for each said individual users in association with the new object listing.

11. The computer readable medium of claim 10, wherein the new object is a protocol object, the object class table is a protocol class table having a column corresponding to a protocol name of the new object.

12. The computer readable medium of claim 10, wherein said object table is a new object class table created during a database update.

13. The computer readable medium of claim 12, wherein said new object is listed in said new object class table on a single row, and said consolidated listing of different object privileges of other users is contained in a column of said row.

14. The computer readable medium of claim 10 further comprising instructions for selectively granting individual users object privileges to said new object comprises granting said object privileges according to each individual user's role.

15. The computer readable medium of claim 10, wherein said user's system privileges are relative to an external table, and comprise no privilege, the privileges to create a readable external table, create a writeable external table, and create both a readable and writeable external table, and where said object privileges to said new object comprise none, create read, create write, and create both read and write.

16. The computer readable medium of claim 15, wherein said selectively granting comprises mapping said individual user's system privileges to said new object privileges.

17. The computer readable medium of claim 10 further comprising instructions for deleting system privilege metadata from a system privilege table upon said storing said object privileges to said new object.

18. The computer readable medium of claim 10 further comprising instructions for checking a user's new object privileges before granting a user's request for an action on said new object.

* * * * *

UNITED STATES PATENT AND TRADEMARK OFFICE
CERTIFICATE OF CORRECTION

PATENT NO. : 9,111,114 B1
APPLICATION NO. : 13/371333
DATED : August 18, 2015
INVENTOR(S) : King Lun Choi and Alon Goldshuv It is certified that error appears in the above-identified patent and that said Letters Patent is hereby corrected as shown below:

Claims

Claim 10, column 5, line 43: delete "object objects" and insert -- objects --, therefor.

Signed and Sealed this
Second Day of August, 2016

Michelle K. Lee
*Director of the United States Patent and Trademark Office*